(No Model.) 2 Sheets—Sheet 1.
G. D. WORSWICK.
VENTILATING FRUIT BOX.
No. 549,043. Patented Oct. 29, 1895.
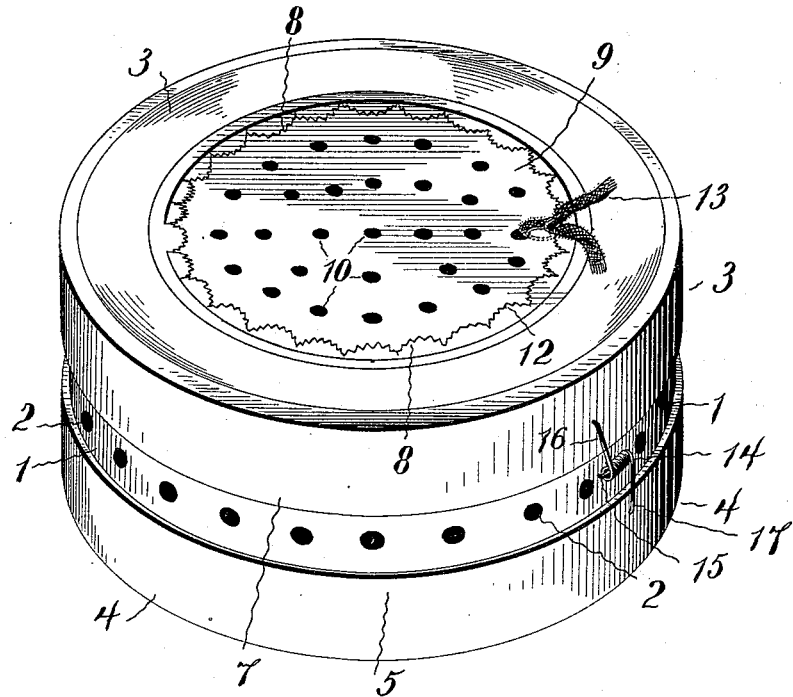
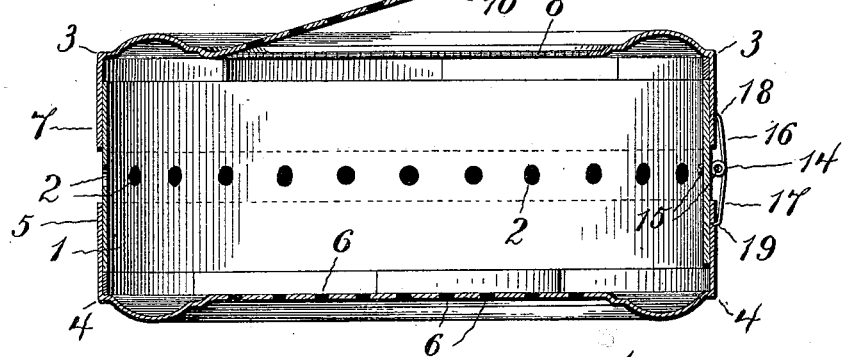
Witnesses:
Jas. E. Hutchinson
Thos. A. Green
Inventor.
George D. Worswick,
By James L. Norris.
Atty.

(No Model.) 2 Sheets—Sheet 2.

G. D. WORSWICK.
VENTILATING FRUIT BOX.

No. 549,043. Patented Oct. 29, 1895.

Witnesses:
Jas. E. Hutchinson
Thos. A. Gunn

Inventor:
George D. Worswick,
By James L. Norris.
Atty

UNITED STATES PATENT OFFICE.

GEORGE DRAPER WORSWICK, OF SAN JOSÉ, CALIFORNIA.

VENTILATING FRUIT-BOX.

SPECIFICATION forming part of Letters Patent No. 549,043, dated October 29, 1895.

Application filed June 15, 1895. Serial No. 552,927. (No model.)

*To all whom it may concern:*

Be it known that I, GEORGE DRAPER WORSWICK, a citizen of the United States, residing at San José, in the county of Santa Clara and State of California, have invented new and useful Improvements in Ventilating Fruit-Boxes, of which the following is a specification.

This invention has for its object to provide a new and improved ventilating fruit box or crate of such construction and form that the fruit or other perishable articles can be advantageously placed in position and the facing of the fruit effected in a comparatively small package to produce a desirable display, while the fruit or articles will be effectually protected by the walls of the box or crate and preserved by the adequate provision for air ventilation.

The invention also has for its object to provide a new and improved fruit box or crate which possesses the very desirable characteristics of an ornamental cover adapted to be moved for exposing the faced fruit to view.

The invention also has for its object to provide a new fruit box or crate which enables the top and bottom of the packed or stored fruit or articles to be readily inspected through the medium of two readily removable and replaceable covers having ventilating-openings of any suitable form.

The invention also has for its object to provide a fruit box or crate having removable and replaceable covers with novel means for independently securing the covers in place on the box-body and enabling either cover to be quickly unfastened and removed for the purpose of inspecting either the bottom or top layer of the fruit or articles packed in the box or crate.

To accomplish all these objects my invention consists in the features of construction and the combination or arrangement of parts hereinafter described and claimed, reference being made to the accompanying drawings, in which—

Figure 3:
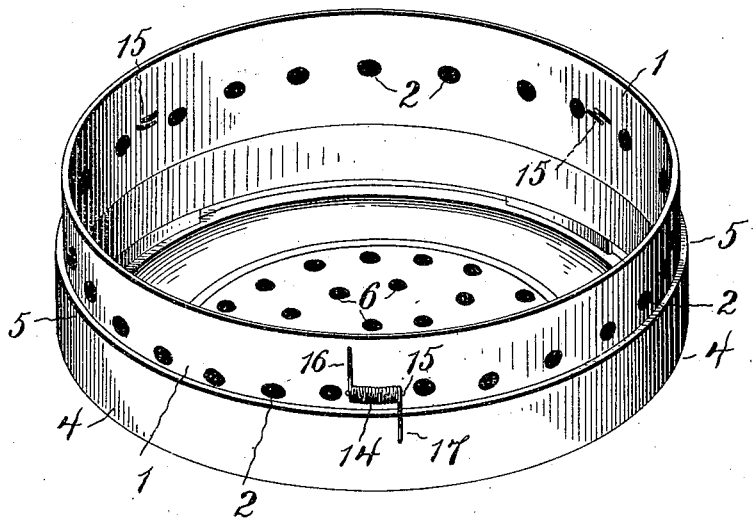
Figure 4:
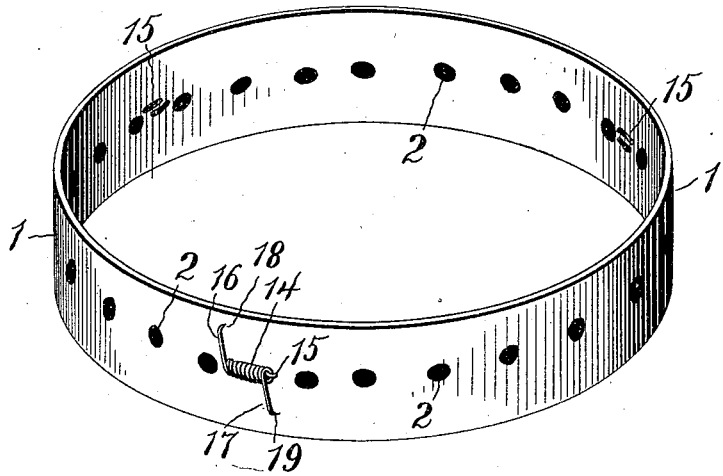

Figure 1 is a perspective view of my improved ventilating fruit box or crate. Fig. 2 is a vertical sectional view taken centrally through the box-body. Fig. 3 is a detail perspective view of a part of the box. Fig. 4 is a detail perspective view of the body of the box.

In order to enable those skilled in the art to make and use my invention, I will now describe the same in detail, referring to the drawings, wherein—

The numeral 1 indicates the box-body, which is composed of an endless circular band of paper, cardboard, or any other material suitable for the purpose. This endless band is made by cutting a narrow strip of material, perforating the same along the median line thereof to provide an annular row of ventilating openings or perforations 2, and lapping the ends of the band upon one another and firmly securing them together. The perforated endless band is designed to operate in connection with removable and replaceable top and bottom covers 3 and 4. The bottom cover is in the form of a disk with a vertical flange or rim 5 adapted to slide upon the circular endless band composing the box-body. The main portion of the bottom cover is formed with numerous openings or perforations 6, Fig. 4. The top cover is of a form or shape similar to the bottom cover, and is constructed with an annular rim or flange 7, adapted to slide upon the box-body in a manner similar to the ordinary cover of a box.

The horizontal wall of the top cover is formed with an approximately circular opening of large dimensions, formed in its edge at regular intervals with notches, as at 8. This enlarged central opening serves to view the upper layer of fruit or other perishable articles packed or stored in the box or crate, and said opening is designed to be closed through the medium of a secondary lid 9, having numerous perforations, as at 10, and constructed at its edge or periphery with numerous perforations 12, adapted to register and engage with the notches 8 in the edge of the enlarged opening in the horizontal body portion of the top cover 4. The secondary lid may be provided with any suitable handle for the purpose of removing and replacing the same. The handle in the present instance is simply a piece of ribbon tied to the lid, as at 13.

The top and bottom covers of the box-body are designed to be independently secured in place, so that either or both can be quickly removed and replaced whenever it is desired to inspect or view the top and bottom layers of fruit or other articles packed or stored in the box or crate.

To accomplish the secure connection of the covers with the box-body I provide the latter along its median line with a plurality of independent or separate springs 14, each of which is secured in place through the medium of a clip 15, and has its extremities bent in reverse directions to provide upwardly and downwardly extending arms 16 and 17. The extremities of the spring-arms 16 and 17 are bent laterally to form spurs 18 and 19. The spurs 18 are adapted to engage the flange 7 of the top cover 4, and the spurs 19 are adapted to engage the flange 5 of the bottom cover 3.

I prefer to employ three spiral springs, suitably disposed around the box-body; but a greater or less number can be employed without altering the spirit of my invention.

The spring-arms 16 can be readily sprung away from engagement with the flange 7 of the top cover 4, and then the latter can be readily removed. If the top cover be replaced and secured by the spring-arms, the box can be turned upside down, and by springing the spring-arms 17 out of engagement with the flange 5 of the bottom cover 3 the latter can be removed. By this means it is possible to thoroughly inspect the entire contents of the box; but obviously the upper and lower layers of fruit or other articles packed or stored in the box can be inspected by simply removing the secondary lid 9 to view the top layer of fruit or other articles, while the bottom layer can be viewed through the ventilating-perforation 6 in the bottom cover 3.

The clips 15 are simply pieces of wire inserted through the coiled springs and having their extremities forced through the box-body and clinched or held on the inside thereof in any suitable manner.

The spring-fastenings described provide novel, simple, and efficient means for independently securing the top and bottom covers in position on the box-body, while enabling the top and bottom covers to be quickly removed and replaced whenever desired.

In packing or storing fruit or other articles in my improved fruit box or crate the fruit or other articles can be packed according to what packers usually call "facing"—that is to say, placing the faces of the fruit or articles so that in the top layer the faces are uniformly arranged and are all visible to the eye throughout the entire package. This is easily accomplished in my invention by turning the fruit-box upside down and using the actual top cover as a bottom to commence the packing or storing of the articles. The fruit is placed in a systematic order on the bottom and the box or crate is filled up, after which the bottom 3 is placed in position and the box is turned right side up, so that it stands in the position represented in Fig. 1, whereby the fruit is faced at the top of the box. It will, of course, be obvious that both the top and bottom layers of the fruit can be faced, so that whichever end of the box is uppermost the faced fruit will be presented to view through the ventilating perforations.

The annular row of perforations in the median line of the endless band constituting the box-body, and the perforations in the secondary lid 9 and in the box-cover 3 secure ample means for ventilation, so that perishable articles are preserved.

By my invention I provide a ventilating fruit-box wherein what fruit-packers term "facing" is readily effected and is applicable to comparatively-small packages, which has not heretofore been practically possible. I also produce a ventilating fruit-box wherein the top and bottom layers of fruit packed or stored therein can be quickly inspected.

The improved box is provided with superior ventilation and the secondary lid 9 provides an ornamental device which imparts a handsome appearance to the structure as a whole, and can be readily removed for exposing nearly the entire top layer of fruit or other articles.

My improved fruit-box comprises in its construction an endless band forming a box-body and provided with ventilating-openings and with spring-fastenings for independently securing in position the top and bottom ventilating-covers, which latter are flanged to slide over the box-body. It is believed that these characteristics, combined in one structure, provide a new article which is very advantageous in actual use.

Having thus described my invention, what I claim is—

1. As an improved article of manufacture, a ventilating fruit box, consisting of an endless band constituting the box body which is perforated approximately along its median line and provided with spring fastenings attached to said band at intervals, and top and bottom removable and replaceable covers constructed with ventilating perforations and having flanges which slide over the box body and are adapted to be engaged by the spring fastenings, substantially as described.

2. A fruit box, consisting of a circular, endless band, perforated approximately along its median line to secure ventilation, and removable and replaceable top and bottom covers having flanges adapted to slide over the endless band, one of the covers having an enlarged, central opening to which is fitted a removable secondary lid having numerous perforations, substantially as described.

3. A fruit box, consisting of a perforated, circular box body, removable and replaceable top and bottom covers constructed with perforations and having flanges adapted to slide upon the box body, and spring fastenings secured to the box body and having spring arms extending upwardly and downwardly to respectively engage the flanges of the top and bottom covers, said cover flanges being of such width relatively to the width of the body that the perforations in the latter shall not be covered, substantially as described.

4. A fruit box, consisting of a circular box body having ventilating perforations, removable and replaceable top and bottom covers having flanges adapted to slide over the circular box body, and one of said covers having an enlarged central opening, the edge of which is provided with notches to which is fitted a movable secondary lid having projections engaging said notches, and fastening devices for independently securing the top and bottom covers in position on the box body, substantially as described.

5. A fruit box, consisting of a circular box body having ventilating perforations, movable top and bottom covers having flanges adapted to slide upon the box body, and one of said covers having an enlarged circular opening to which is movably fitted a circular lid having perforations, and spring fastenings secured to the box body between the adjacent edges of the flanges of the top and bottom covers, said spring fastenings being provided with means to independently engage the flanges of said covers, substantially as and for the purpose described.

In testimony whereof I have hereunto set my hand in presence of two subscribing witnesses.

GEORGE DRAPER WORSWICK.

Witnesses:
C. M. WOOSTER,
J. HINMAN.